(12) United States Patent
Horton et al.

(10) Patent No.: US 11,627,724 B2
(45) Date of Patent: *Apr. 18, 2023

(54) AGRICULTURAL DRONE FOR USE IN LIVESTOCK FEEDING

(71) Applicant: Digi-Star, LLC, Fort Atkinson, WI (US)

(72) Inventors: Christopher V. Horton, Stoughton, WI (US); Samuel R. Vorpahl, Fort Atkinson, WI (US)

(73) Assignee: Digi-Star, LLC, Fort Atkinson, WI (US)

( * ) Notice: Subject to any disclaimer, the term of this patent is extended or adjusted under 35 U.S.C. 154(b) by 880 days.

This patent is subject to a terminal disclaimer.

(21) Appl. No.: 16/262,035

(22) Filed: Jan. 30, 2019

(65) Prior Publication Data

US 2019/0159431 A1    May 30, 2019

Related U.S. Application Data

(62) Division of application No. 14/864,245, filed on Sep. 24, 2015, now Pat. No. 10,231,441.

(51) Int. Cl.
| | |
|---|---|
| *A01K 29/00* | (2006.01) |
| *A01K 5/02* | (2006.01) |
| *A01K 1/10* | (2006.01) |
| *G01F 23/292* | (2006.01) |
| *G01K 13/02* | (2021.01) |
| *A01K 5/01* | (2006.01) |

(52) U.S. Cl.
CPC .............. *A01K 29/005* (2013.01); *A01K 1/10* (2013.01); *A01K 5/01* (2013.01); *A01K 5/02* (2013.01); *G01F 23/292* (2013.01); *G01K 13/02* (2013.01)

(58) Field of Classification Search
CPC .......... A01K 29/005; A01K 1/10; A01K 5/01; A01K 5/02; G01F 23/292; G01F 13/02
See application file for complete search history.

(56) References Cited

U.S. PATENT DOCUMENTS

| | | |
|---|---|---|
| 3,781,837 A | 12/1973 | Anderson et al. |
| 3,893,111 A | 7/1975 | Albert |
| 4,148,278 A | 4/1979 | Anderson |
| 4,399,821 A | 8/1983 | Bowers |
| 4,844,076 A | 7/1989 | Lesho et al. |
| 4,854,328 A | 8/1989 | Pollack |
| 4,865,044 A | 9/1989 | Wallace et al. |

(Continued)

FOREIGN PATENT DOCUMENTS

| | | |
|---|---|---|
| CN | 103299975 A | 9/2013 |
| CN | 103723275 A | 4/2014 |

(Continued)

OTHER PUBLICATIONS

Examination Report No. 1 dated Aug. 29, 2019, in connection with Australian Patent Application No. 2016326336, 5 pgs.

(Continued)

*Primary Examiner* — Richard T Price, Jr.
(74) *Attorney, Agent, or Firm* — Chiesa Shahinian & Giantomasi PC (57) ABSTRACT

A method and system utilizing one or more agricultural drones for real-time monitoring, delivery and dispensing of feed in feed bunks associated with feed lots.

17 Claims, 7 Drawing Sheets

(56) References Cited

U.S. PATENT DOCUMENTS

| | | | |
|---|---|---|---|
| 5,008,821 A | 4/1991 | Pratt et al. | |
| 5,424,957 A * | 6/1995 | Kerkhoff | A01K 5/02 700/240 |
| 5,457,627 A * | 10/1995 | Cureton | A01K 5/02 705/34 |
| 5,474,085 A | 12/1995 | Hurnik et al. | |
| 5,673,647 A * | 10/1997 | Pratt | A01K 5/02 119/51.02 |
| 5,751,576 A | 5/1998 | Monson | |
| 5,974,348 A | 10/1999 | Rocks | |
| 5,984,875 A | 11/1999 | Brune | |
| 6,032,084 A | 2/2000 | Anderson et al. | |
| 6,059,733 A | 5/2000 | Brune et al. | |
| 6,099,482 A | 8/2000 | Brune et al. | |
| 6,216,053 B1 * | 4/2001 | Cureton | A01K 5/02 700/104 |
| 6,445,983 B1 | 9/2002 | Dickson et al. | |
| 6,529,615 B2 | 3/2003 | Hendrickson et al. | |
| 6,745,126 B1 * | 6/2004 | Pavlak | A01K 5/02 701/50 |
| 7,479,884 B1 | 1/2009 | Fullerton | |
| 7,536,976 B1 | 5/2009 | Bryant | |
| 7,689,434 B2 | 3/2010 | Cureton et al. | |
| 8,297,231 B2 | 10/2012 | Yanai et al. | |
| 8,442,765 B1 | 5/2013 | Ingvalson | |
| 8,588,887 B2 | 11/2013 | Arneson et al. | |
| 8,730,014 B2 | 5/2014 | Fullerton | |
| 9,037,521 B1 | 5/2015 | Mewes et al. | |
| 2002/0010390 A1 | 1/2002 | Guice et al. | |
| 2002/0116200 A1 * | 8/2002 | Cureton | H04N 13/194 705/1.1 |
| 2004/0162638 A1 | 8/2004 | Soloman | |
| 2005/0193954 A1 * | 9/2005 | Cureton | H04N 13/194 119/53 |
| 2007/0208442 A1 | 9/2007 | Perrone | |
| 2009/0187392 A1 | 7/2009 | Riskey et al. | |
| 2009/0256909 A1 | 10/2009 | Nixon | |
| 2009/0288606 A1 * | 11/2009 | Zimmerman | A01K 5/0225 119/51.02 |
| 2009/0294573 A1 | 12/2009 | Wilson et al. | |
| 2009/0299496 A1 | 12/2009 | Cade | |
| 2010/0017046 A1 | 1/2010 | Cheung et al. | |
| 2011/0282578 A1 | 11/2011 | Miksa et al. | |
| 2012/0022719 A1 | 1/2012 | Matos | |
| 2012/0101861 A1 | 4/2012 | Lindores | |
| 2012/0109614 A1 | 5/2012 | Lindores | |
| 2012/0237083 A1 | 9/2012 | Lange et al. | |
| 2012/0310532 A1 | 12/2012 | Snoeck et al. | |
| 2013/0092087 A1 * | 4/2013 | Bachman | A01K 5/00 119/51.01 |
| 2013/0173321 A1 | 7/2013 | Johnson | |
| 2013/0231968 A1 | 9/2013 | Willness | |
| 2014/0012732 A1 | 1/2014 | Lindores | |
| 2014/0024313 A1 | 1/2014 | Campbell | |
| 2014/0035752 A1 | 2/2014 | Johnson | |
| 2014/0089045 A1 | 3/2014 | Johnson | |
| 2014/0095261 A1 | 4/2014 | Johnson | |
| 2014/0155756 A1 | 6/2014 | Elazari-Volcani | |
| 2014/0188573 A1 | 7/2014 | Avey et al. | |
| 2014/0222246 A1 | 8/2014 | Mohamadi | |
| 2014/0303814 A1 | 10/2014 | Burema et al. | |
| 2014/0312165 A1 | 10/2014 | Mkrtchyan | |
| 2014/0316614 A1 | 10/2014 | Newman | |
| 2015/0037307 A1 | 2/2015 | Bralkowski et al. | |
| 2015/0106434 A1 | 4/2015 | Fiene et al. | |
| 2016/0050840 A1 | 2/2016 | Sauder et al. | |
| 2017/0086429 A1 * | 3/2017 | Horton | G01K 13/02 |
| 2020/0178495 A1 * | 6/2020 | Womble | A01K 5/0114 |

FOREIGN PATENT DOCUMENTS

| | | |
|---|---|---|
| CN | 103770943 A | 5/2014 |
| CN | 203652111 U | 6/2014 |
| DE | 102010046479 A1 | 3/2012 |
| DE | 102014201203 A1 | 7/2015 |
| WO | 2008097080 A1 | 8/2008 |
| WO | 2008098290 A1 | 8/2008 |
| WO | 2010057266 A1 | 5/2010 |
| WO | 2013041636 A1 | 3/2013 |
| WO | 2014058337 A1 | 4/2014 |
| WO | 2014146884 A1 | 9/2014 |
| WO | 2015142166 A1 | 9/2015 |
| WO | 2016123201 A1 | 8/2016 |

OTHER PUBLICATIONS

"Different view drones used in feedlot," Sep. 9, 2015, retrieved from the Internet on Jan. 8, 2020 at https://www.news-mail.com.au/news/different-view-drones-used-in-feedlot/2760861/, 3 pgs.

Examination Report No. 2 dated Jan. 15, 2020, in connection with Australian Patent Application No. 2016326336, 10 pgs.

Examination report No. 1 dated Dec. 23, 2019, in connection with Australian Patent Application No. 2016328274, 4 pgs.

"Drones for Agricultural Crop Surveillance," Precision Drone, Agriculture, retrieved on May 20, 2015, from http://www.precisiondrone.com/agriculture/, 3 pgs.

"Drones for Agriculture," SenseFly Ltd., retrieved on May 20, 2015, from https://www.sensefly.com/applications/agriculture.html, 5 pgs.

"EBee Ag—The Precision Agriculture Drone," retrieved on May 27, 2015, from https://www.sensefly.com/drones/ebee-ag.html, 7 pgs.

"The Drone for Precision Agriculture" Brochure, eBee senseFly, senseFly Ltd., 2014, 7 pgs.

Postflight Terra 3D Professional photogrammetry software, Feature List, Version 3.4, Release Date: Apr. 8, 2015, 2 pgs.

Utility U.S. Appl. No. 14/860,072, filed Sep. 21, 2015.

Utility U.S. Appl. No. 14/859,974, filed Sep. 21, 2015.

International Search Report and Written Opinion dated Sep. 27, 2016 in connection with International Patent Application No. PCT/US2016/041705, 10 pages.

International Search Report and Written Opinion dated Nov. 9, 2016 in connection with International Patent Application No. PCT/US2016/051673, 8 pages.

Welshans, Krissa, "Sky's the Limit for UAV's in Ag—Feedstuffs Foodlink" published on Mar. 27, 2015; URL: http://feedstuffsfoodlink.com.story-skys-limit-uavs-ag-0-125732-printversion; retrieved on Dec. 5, 2016.

"PrecisonHawk>Turn Applications into Data: Livestock Management PrecisionHawk,"; precisionhawk.com, Jul. 15, 2014, XP055314971, URL: http:// media. precisionhawk.com/topic/turn-applications-into-data-livestock-management; retreived on Oct. 28, 2016.

International Search Report and Written Opinion dated Nov. 25, 2016 in connection with International Patent Application No. PCT/US2016/051584 14 pages.

"Unmanned Aerial Vehicle, Farming and Cattle", Penn State Extension, published on Feb. 24, 2015: URL:http://extension.psu.edu/animals/dairy/news/2015/unmanned-aerial-vehicles-farming-and-cattle; retrieved on Dec. 5, 2016.

Jesperson, Lee, "Flying Drone Around the Feedlot", published on Dec. 27, 2014; URL://www.youtube.com/watch?v=K122WAURDY; retrieved on Oct. 31, 2016.

International Search Report and Written Opinion dated Feb. 9, 2017 in connection with International Patent Application No. PCT/US2016/059626 12 pages.

\* cited by examiner

AGRICULTURAL DRONE FOR USE IN LIVESTOCK FEEDING

This application is a divisional of prior application Ser. No. 14/864,245 filed on Sep. 24, 2015, the disclosures of which are herein incorporated by reference in their entirety.

TECHNICAL FIELD

The present invention relates generally to feeding livestock in a feedlot, and, more particularly, to a process and system for using an agricultural drone for monitoring and assisting in the delivery of feed to feed bunks in feedlots.

BACKGROUND OF THE INVENTION

Modern livestock operations employ a large percentage of beef cattle and other livestock fed by commercial feedlot operators. These businesses are often independent contractors which accept livestock (e.g., cattle) from farmers or ranchers at a certain size and age and feed them until they reach a designated size for slaughter. Typically, the farmer or rancher pays the commercial feedlot operator a rental fee for space and care in the feedlot pen(s) and for the associated feeding costs including other operating expenses.

In the feedlot, cattle are grouped in pens according to their feed requirements. Feedlots generally feed thousands of head of cattle or other livestock at various stages of growth. Cattle within a feedlot are physically contained in cattle pens where each pen will typically have a feed bunk to receive and hold feed for the cattle to consume. Ownership of particular cattle in the feedlot is defined by a unique lot number, for example, and the number of cattle in a particular feedlot can vary and may occupy a fraction of one or more cattle pens.

Within a particular pen, cattle are fed substantially the same feed ration (i.e., substantially the same ration type and quantity) and any one feedlot may have a large number of pens to accommodate cattle at various growth stages or that require special feed handling due to illness or malnourishment, for example. Of course, feeding livestock in such large feedlots is a complex and time-consuming operation given the large number of ration quantities that need determination each day and then delivering such ration quantities to each pen for deposit in a particular feed bunk.

Generally, feeding cattle in a feedlot is two-step process that is completed once or multiple times a day with a goal of feed being available to cattle full time while minimizing excess feed that will be lost due to spoilage. First, the ration for each pen must be calculated to determine the ration quantity to be fed to the associated cattle at the next feeding, and second, feed trucks must be loaded and dispatched with the desired ration quantities to the particular feed bunk delivery and for disbursement of the feed. This first step in calculating the amount of feed required is a process referred to as "reading" the bunks to determine the amount of remaining feed. Typically, a person is charged with reading the bunks and performs this task by driving past all the active cattle pens in the feedlot in a vehicle (e.g., pickup truck) and visually estimates the amount of feed left in each feed bunk from a prior feeding. The amount of feed then designated for a future ration depends on several factors including but not limited to the number of cattle in a particular pen, the type of feed ration, the amount of feed remaining from a prior feeding, weather, and consumption trends.

The recordation of information related to such factors is typically recorded by the person performing the feed bunk reading in a so-called "yard sheet" along with the pen number and lot number of the associated cattle. This person also notes, based on the observation of the feed bunk and reviewing the available consumption history, whether the ration quantity is in need of change which will be noted on a so-called "feed card". The individual feed cards are then delivered to a central location to be utilized for determining and loading the next delivery of feed by the feed trucks to the respective pens.

As noted above, the feed delivery is the second process step and typically utilizes a so-called "pen ticket" that is prepared for each of the cattle pens. The ration quantities for a number of pens are weighed and placed in a particular feed truck for delivery to the respective feed bunks. A feed truck will usually carry only one type of ration and the truck includes a scale for weighing quantities loaded or discharged from the truck. At the feed bunk associated with a particular pen, the operator of the truck discharges the desired ration quantity by noting the desired loss of weight of ration from the truck on the scale.

As will be appreciated, the above-detailed process is complex, labor intensive and time consuming. Further, the reading of feed bunks can be slow, inaccurate and subject to a variety of data entry errors. For example, these readings typically occur before daylight or in dim morning light with the person trying to drive his vehicle close (sometimes without stopping the vehicle) enough to each feed bunk to make good visual contact with the feed to ascertain feed levels. Similarly, the feed delivery step is labor intensive and time consuming. The feed truck routes and dispensing of feed rations require a large workforce to perform the feed bunk reading which must all be determined in advance and many times in the course of a day in large feedlot situations for the continual feeding of the livestock.

Therefore, a need exists for an improved technique for reliably, efficiently and more effectively monitoring and assisting in the delivery of feed to feed bunks in feedlots.

BRIEF SUMMARY OF THE EMBODIMENTS

In accordance with various embodiments, one or more agricultural drones are used to improve the real-time monitoring, analysis, delivery and dispensing of feed in feed bunks associated with feed lots.

More particularly, in accordance with an embodiment, one or more agricultural drones are dispatched to fly over one or more feedlots having one or more feed bunks associated therewith. In accordance with the embodiment, the flying of the drone and the traversing of the feedlots allows the drone to monitor and examine individual feed bunks in order to facilitate rapid and real-time estimates of the amount of feed left in a particular feed bunk from a prior feeding. Illustratively, such estimate is accomplished on a volume basis whereby a remaining volume of feed in the feed bunk is determined from the information collected by the agricultural drone. This data on the amount of feed remaining in a particular feed bunk(s) is then used, in accordance with the embodiment, to determine and/or adjust the amount feed disbursed in the next feeding and/or to adjust the priority for dispatching feed (e.g., a determination that one feed bunk of a plurality of feed bunks is particularly low on feed or has been emptied of feed).

In accordance with an embodiment, the agricultural drone is configured with an imaging apparatus which may be a general still camera, a video camera having a video recording function, a stereoscopic camera capable of obtaining a three-dimensional image using parallax, a 360 degree camera capable of obtaining 360 degree video, a hyper-spectrum camera, and/or a thermal imaging device. For example, a hyper-spectrum camera is used for obtaining an image having a wavelength band from near-ultraviolet (for example, 350 nm) to near-infrared (for example, 1100 nm) and splits the wavelength of the image at predetermined intervals (for example, 5 nm) using a diffraction grating or the like to obtain hyper spectrum information. This hyper spectrum information facilitates an analysis to obtain, for example, the amount (i.e., volume) of feed resident in a feed bunk. For example, the agricultural drone may communicate such feed bunk analysis information to a central location for processing by a feed management control center to facilitate the loading of the next delivery of feed by feed trucks to respective feed bunks in accordance with feed rations determined from the feed bunk analysis information.

In accordance with another embodiment, the agricultural drone may process such feed bunk analysis information directly while in-flight and communicate the appropriate feed loading (i.e., rations) information to a respective feed truck(s) to facilitate the loading of the next delivery of feed by such feed trucks to respective feed bunks. In accordance with this embodiment, the flying of the agricultural drone and the traversing of the feed lots by the feed truck(s) occur substantially contemporaneously. As such, the agricultural drone communicates the collected feed bunk information, as the drone flies over the feed bunk, to the feed truck operating in some proximity to the drone so that the vehicle can utilize the feed information to make appropriate adjustments to improve the overall delivery of feed to the feed bunks. For example, the feed bunk analysis information can be used to measure and determine the real-time level of feed being consumed by the livestock and whether the feed is actually being consumed at the desired rate or level.

These and other advantages of the embodiments will be apparent to those of ordinary skill in the art by reference to the following detailed description and the accompanying drawings.

DETAILED DESCRIPTION

In accordance with various embodiments, one or more agricultural drones are used to improve the real-time monitoring, delivery and dispensing of feed in feed bunks associated with feed lots.

Figure 1:
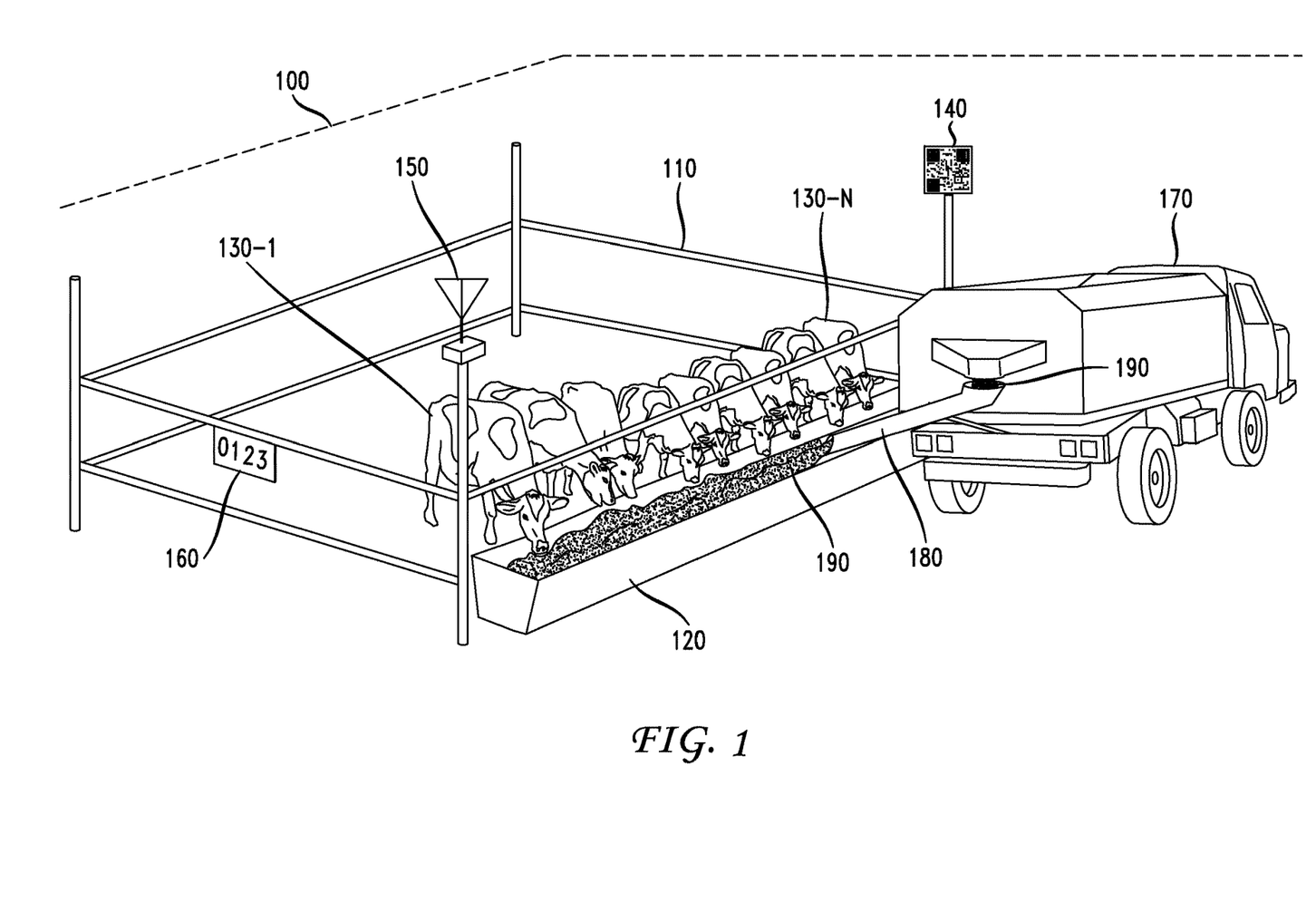
FIG. 1 shows an illustrative feedlot, feed bunk and feed truck arrangement for the feeding of livestock.

FIG. 1 shows an illustrative feedlot 100, feed bunk 120 and feed truck 170 arrangement for the feeding of livestock. As shown, feedlot 100 has pen 110 holding a plurality of livestock (illustratively cattle 130-1 through cattle 130-N), feed bunk 120 for holding a ration (i.e., a type of feed, in a selected quantity selected for the livestock contained by pen 110, i.e., cattle 130-1 through 130-N. Pen 110 has an associated identification symbol 160 to distinguish pen 110 from other pens (not shown) in feedlot 100 so that a driver of feed truck 170 driving by feedlot 100 can clearly distinguish pen 110 when reading feed bunk 130 or delivering feed 190 in a designated feed ration to feed bunk 130 by feed truck 170 through feed chute 180. Alternatively, the identification of pen 110 can be automated using an RF signal transmitted locally by transmitter 150 and/or by affixing bar code 140 to pen 110 for reading by a bar code scanner, and/or by using an associated GNSS location, for example. As will be appreciated, while a single pen, i.e., pen 110, is shown in feedlot 100 it will be understood that feedlot 100 can be a size of hundreds of miles with many feed bunks located throughout its geographic footprint.

Figure 2:
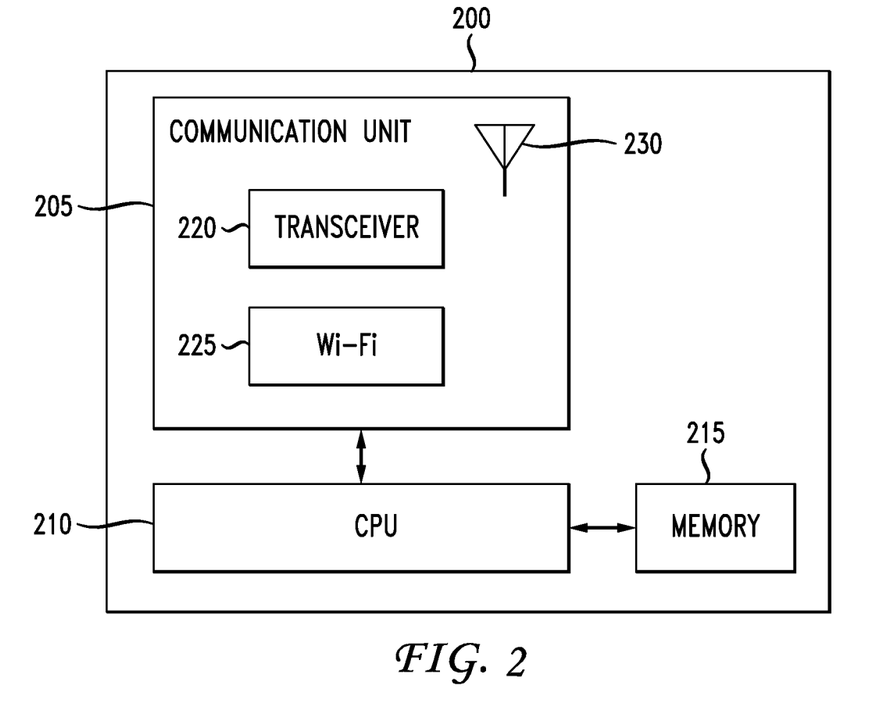
FIG. 2 shows a high-level block diagram of a feed bunk analysis unit which is integral with the feed truck of FIG. 1 in accordance with an embodiment.

In accordance with an embodiment, feed truck 170 is configured with feed bunk analysis unit 200 as shown in FIG. 2. Feed bunk analysis unit 200 includes communication unit 205 having transceiver 220, Wi-Fi controller 225 and antenna 230, central processing unit (CPU) 210, and memory 215. As detailed further herein below, feed bunk analysis unit 200, being integral with feed truck 170, will facilitate real-time communications between feed truck 170 and one or more agricultural drones flying in proximity thereto in order to improve the monitoring, analysis and/or delivery of feed to feed bunks in a feedlot. Further, in accordance with an embodiment, CPU 210 can execute certain field management application software (as stored in memory 215) for receiving and processing the feed bunk analysis information transmitted from the one or more agricultural drones, as detailed further herein below.

Figure 3:
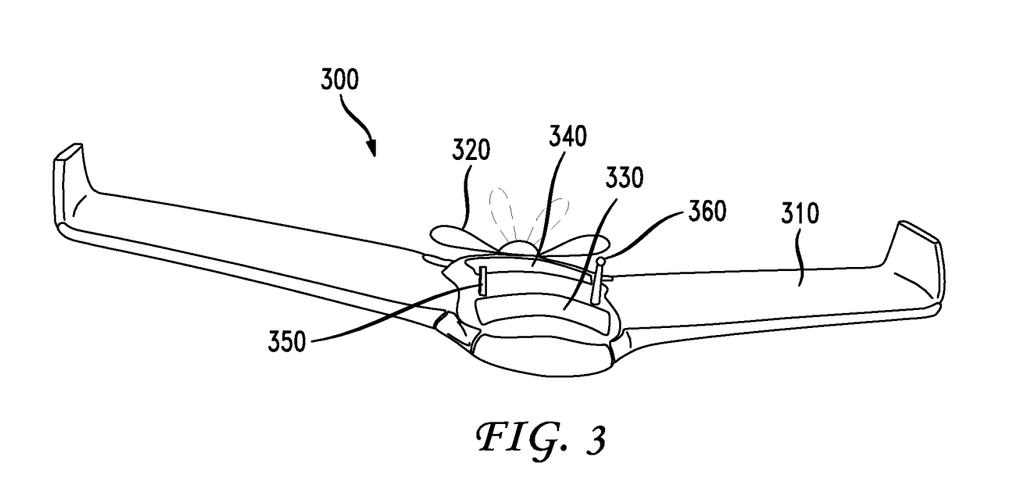
FIG. 3 shows an illustrative agricultural drone in accordance with an embodiment.

In particular, FIG. 3 shows an illustrative agricultural drone 300 in accordance with an embodiment. As shown, agricultural drone 300 includes a lightweight body and wings 310, motor assembly 320, built-in GNSS/RTK/PPP receiver 330, imaging apparatus 340, pitot tube 350 and antenna 360. Of course, agricultural drone 300 will include other components and functionality not depicted in FIG. 3 such as batteries, ground sensors, other onboard electronics and communications, onboard artificial intelligence, collision avoidance, to name a few. One such commercially available agricultural drone is the eBee Ag drone sold by senseFly Ltd, Route de Geneve 38, 033 Cheseaux-Lausanne, Switzerland. Agricultural drone 300 is fully autonomous and will fly in accordance with a predefined flight plan and in the case of agricultural applications the drone will capture highly accurate images of a particular field or fields and/or a particular feedlot or feedlots covering hundreds of hectares/acres in a single flight.

In accordance with an embodiment, agricultural drone 300 is configured with imaging apparatus 340 which includes at least one imaging device such as a general still camera, a video camera having a video recording function, a stereoscopic camera capable of obtaining a three-dimensional image using parallax, a 360 degree camera capable of obtaining 360 degree video, a hyper-spectrum camera, and/or a thermal imaging device. For example, the hyper-spectrum camera is used for obtaining an image having a wavelength band from near-ultraviolet (for example, 350 nm) to near-infrared (for example, 1100 nm) and splits the wavelength of the image at predetermined intervals (for example, 5 nm) using a diffraction grating or the like to obtain hyper spectrum information. This hyper spectrum information facilitates an analysis to obtain, for example, the amount of feed resident in a feed bunk. For example, as detailed herein below, agricultural drone 300 may communicate such feed bunk analysis information to a central location for processing by a feed management system to facilitate the determination of future ration volumes and the loading of the next delivery of feed by feed trucks to respective feed bunks in accordance with such ration volumes.

Further, for example, when imaging apparatus 340 includes the thermal imaging device (e.g., a laser or other such device) this provides agricultural drone 300 with the ability to monitor the feed bunk by reading a temperature of the feed bunk surface. This is particularly useful in situations where a feed bunk may be depleted of feed (as also determined by agricultural drone 300 by taking an image of the feed bunk in accordance with an embodiment) and it may be important to determine the length of time since the feed depletion has occurred for that particular feed bunk. For example, in so-called "slick" conditions it will be understood that the feed bunk was only recently depleted because the concrete that forms a portion of the feed bunk is wet (from saliva deposited by the livestock as they ate feed from the feed bunk). As such, in such a slick environment, the saliva moisture will be evaporating from the feed bunk surface such that the feed bunk surface itself will be cooler than the surrounding natural surfaces of the feed bunk (i.e., other surfaces within the pen associated with the feed bunk, for example, the dirt or grass field surrounding the feed bunk and encompassing the pen). Further, the slick scenario determination will also provide information that the previous feeding included a feed ration that was correctly determined for the feed bunk conditions (i.e., substantially the correct volume of feed). Alternatively, if the feed bunk is in a so-called "dry" condition, the feed bunk surface and such surrounding natural surfaces will be substantially the same temperature. Further, the dry scenario determination will also provide information that the previous feeding included a feed ration that was incorrectly determined for the feed bunk conditions or those conditions have changed (i.e., an increase is needed to the volume of feed in the next feeding). As such, by measuring such temperatures, in accordance with the embodiment, agricultural drone 300 will be collecting and communicating important information regarding the feed bunk in both a volumetric and temporal sense.

Figure 4:
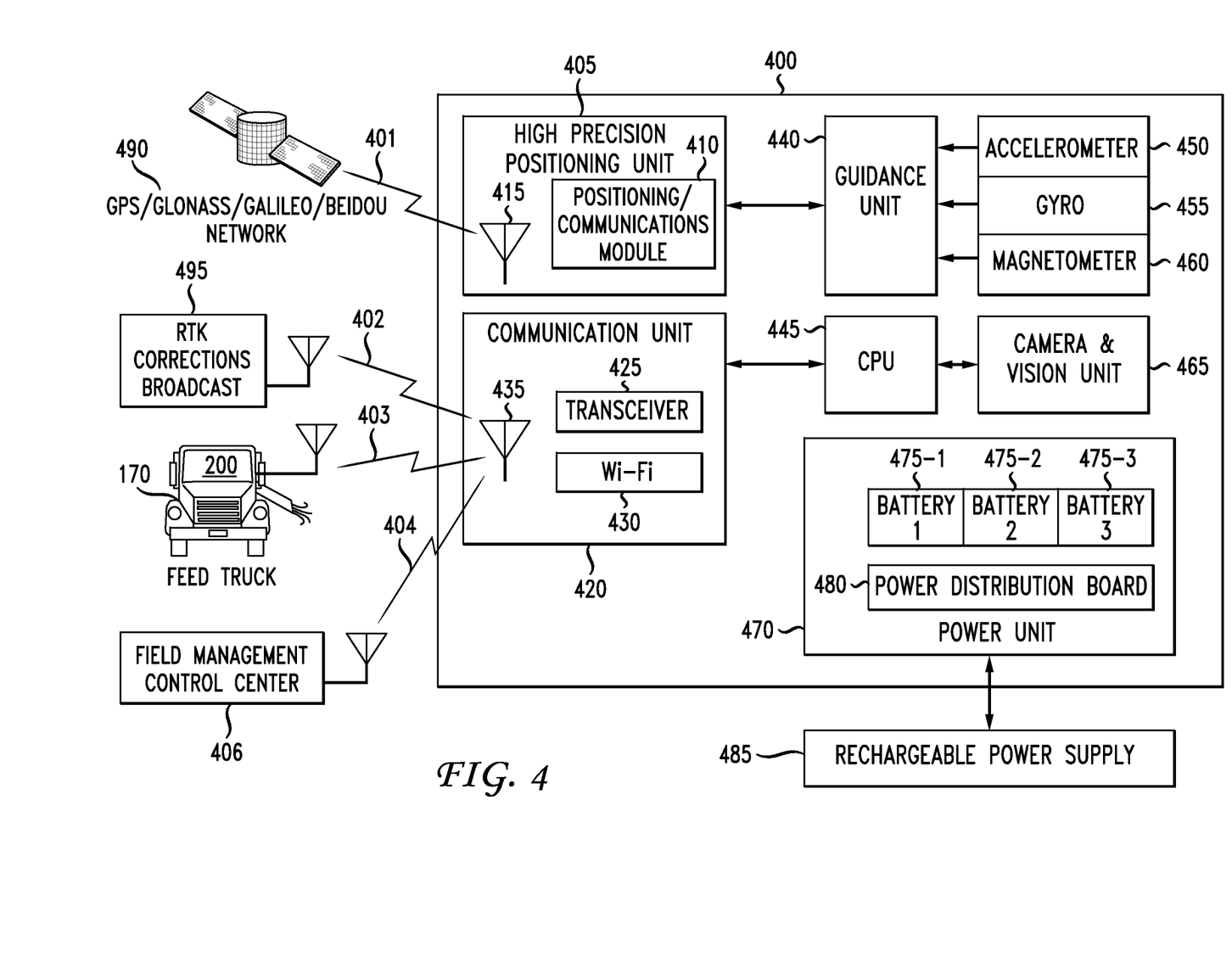
FIG. 4 shows a high-level block diagram of on-board electronics which is integral with the agricultural drone of FIG. 3 in accordance with an embodiment.

FIG. 4 shows a high-level block diagram of on-board electronics 400 which are integral with agricultural drone 300 of FIG. 3 in accordance with an embodiment. As shown, on-board electronics 400 includes high precision positioning unit 405 having positioning/communications module 410 (e.g., a GPS/GLONOSS/GALILEO/BEIDOU positioning/communications module) and antenna 415 which communicates, via communications link 401, with GPS/GLONOSS/GALILEO/BEIDOU network 490 in a well-known fashion, communication unit 420 having transceiver 425, Wi-Fi controller 430 and antenna 435 which interfaces with at least RTK corrections broadcast 495 over communications link 402 in a well-known fashion, guidance unit 440, central processing unit (CPU) 445, accelerometer 450, gyro 455, magnetometer 460, camera and vision unit 465 (forming imaging apparatus 340 shown in FIG. 3, in whole or in part), power unit 470 having batteries 475-1 through 475-3 and power distribution board 480 which interfaces with rechargeable power supply 485 in a well-known fashion. In accordance with various embodiments, agricultural drone 300 will transmit and communicate real-time communications and information to feed truck 170 as configured with feed bunk analysis unit 200 (as shown illustratively in FIG. 4), via communication link 403, utilizing communications unit 420 with respect to a particular feedlot and/or feed bunk under investigation by agricultural drone 300.

In accordance with further embodiments, agricultural drone 300 will transmit and communicate real-time communications and information to field management control center 406, via communication link 404, utilizing communications unit 420 with respect to a particular feedlot and/or feed bunk under investigation by agricultural drone 300, and a user (not shown) working in field management control center 406 may analyze the information received from agricultural drone 300 using well-known field management software applications. Of course, in a further embodiment, agricultural drone 300 may also transmit and communicate such real-time communications and information simultaneously to both feed truck 170 and field management control center 406.

Figure 5:
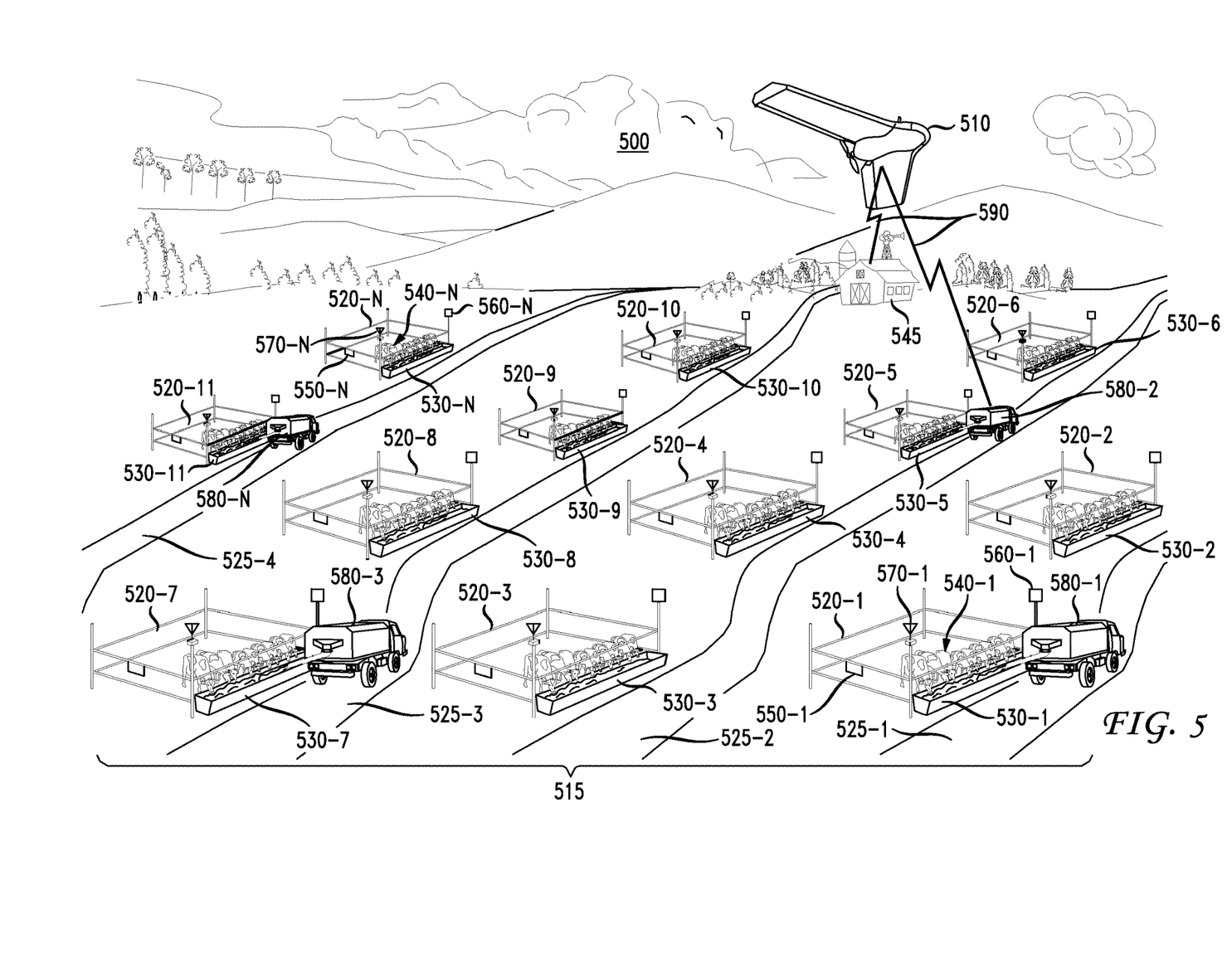
FIG. 5 shows an explanatory diagram of the use of the agricultural drone configured in accordance with FIG. 3 and FIG. 4 for monitoring and assisting with the delivery of feed to a feedlot in accordance with an embodiment.

FIG. 5 shows an explanatory diagram 500 of an embodiment utilizing a plurality of feed trucks, i.e., feed truck 580-1 through feed truck 580-N, each configured in accordance with FIG. 1 and FIG. 2 (as shown illustratively in FIG. 4) in combination with agricultural drone 510 which is configured the same as agricultural drone 300 in accordance with FIG. 3 and FIG. 4. As will be appreciated, while the description of the various embodiments herein utilize agricultural drones configured consistent with agricultural drone 300, the principles and advantages of the embodiments are not limited to such a drone and are equally useful and applicable to other types of drones and unmanned aerial vehicles having the same or similar configurations.

As shown, feed trucks 580-1 through 580-N are travelling along feed alley 525-1, feed alley 525-2, feed alley 525-3, and feed alley 525-4, as the case may be, that are routed through feedlot 515 for the delivery of feed rations to a plurality of feed bunks (i.e., feed bunk 530-1 through 530-N). As shown, agricultural drone 510 is flying over feedlot 515 having a plurality of pens (i.e., pen 520-1 through pen 520-N), with each respective pen holding one or more livestock (e.g., cattle 540-1 through 540-N) and configured with a particular one feed bunk of the plurality of feed bunks 530-1 through 530-N, a particular one transmitter (i.e., transmitter 570-1 through 570-N), a particular one bar code (i.e., bar code 560-1 through 560-N) and a particular one identification symbol (i.e., identification symbol 550-1 through 550-N). It will be understand that the plurality of livestock may be any kind (one or many) of livestock or other animals that are typically fed using feedlots.

The flyover by agricultural drone 510 will be in accordance with a defined flight plan in a well-known manner during which agricultural drone 510 will be collecting real-time information with respect to feedlot 515 and/or one or more of the feed bunks associated therewith (i.e., feed bunk 530-1 through feed bunk 530-N). In accordance with this embodiment, the flying of agricultural drone 510 and the traversing of feedlot 515 by feed trucks 580-1 through 580-N occur substantially contemporaneously. In accordance with further embodiments, agricultural drone 510 may fly in advance of the routing (in whole or in part) of feed trucks 580-1 through 580-N where such routing is determined using the information transmitted from agricultural drone 510.

In accordance with the embodiment, the flying of agricultural drone 510 and the traversing of feedlot 515 (and associated pens 520-1 through 520-N with associated feed bunks 530-1 through 530-N) allows agricultural drone 510 to monitor and examine individual feed bunks in order to facilitate rapid and real-time analysis and estimates of the amount of feed left in a particular feed bunk (e.g., feed bunk 530-1) from a prior feeding. Illustratively, such estimate is accomplished on a volume basis whereby a remaining volume of feed in feed bunk 530-1 is determined from the information collected by agricultural drone 510. This data on the amount of feed remaining in a particular feed bunk(s) is then used, in accordance with the embodiment, to adjust the amount feed disbursed in the next feeding and/or to adjust the priority for dispatching feed (e.g., a determination that one feed bunk of the plurality of feed bunks 530-1 through 530-N is particularly low on feed or has been emptied of feed). Illustratively, these feed disbursement adjustments are determined, in well-known fashion, using field management application software that will analyze the information transmitted and received from agricultural drone 510, either in real-time or at some future time. Further, as detailed above, agricultural drone 510 may also monitor the temperature of the plurality of feed bunks 530-1 through 530-N and/or the temperature of areas immediately surrounding the plurality of feed bunks 530-1 through 530-N to determine whether one or more of the feed bunks are subject to slick or dry feed bunk conditions.

Advantageously, in accordance with the embodiment, the real-time information collected by agricultural drone 510 such as feed bunk images, feed bunk temperatures, feed ration data and/or feed analysis will be utilized and communicated, over one or more communications links 590, to field management control center 545 and/or one or more of the feed trucks 580-1 through 580-N to assist with monitoring, analyzing and dispensing feed to one or more feed bunks (e.g., feed bunk 530-1 through 530-N). Communications links 590 are, illustratively, a wireless communications link established over wireless infrastructure, such as a third party supplied cellular or Wi-Fi network, but in many cases where an existing third party wireless infrastructure does not exist, the user must provide a suitable replacement. In such cases, one type of a user supplied infrastructure configuration is a narrowband single frequency radio system that may be operated over feedlot 515, for example. Such communication is realized with, for example, Wi-Fi radios as well as cellular phones (e.g., 3G/4G/LTE/5G), UHF radios and/or solid state radios.

As such, the real-time information collected, provided and transmitted by agricultural drone 510 allows for increased efficiency, speed and/or accuracy in the delivery of feed rations to feedlots which far exceeds that of traditional, labor intensive feedlot monitoring techniques. Further, given that the feed conditions associated with feedlot 515 and the plurality of feed bunks 530-1 through 530-N can change rapidly due to a variety of adverse conditions (e.g., wind, rain, heat, and health of the livestock, etc.), the application of agricultural drone 510 in real-time allows for the mitigation of such adverse conditions and their overall impact on the feeding of the livestock.

Figure 6:
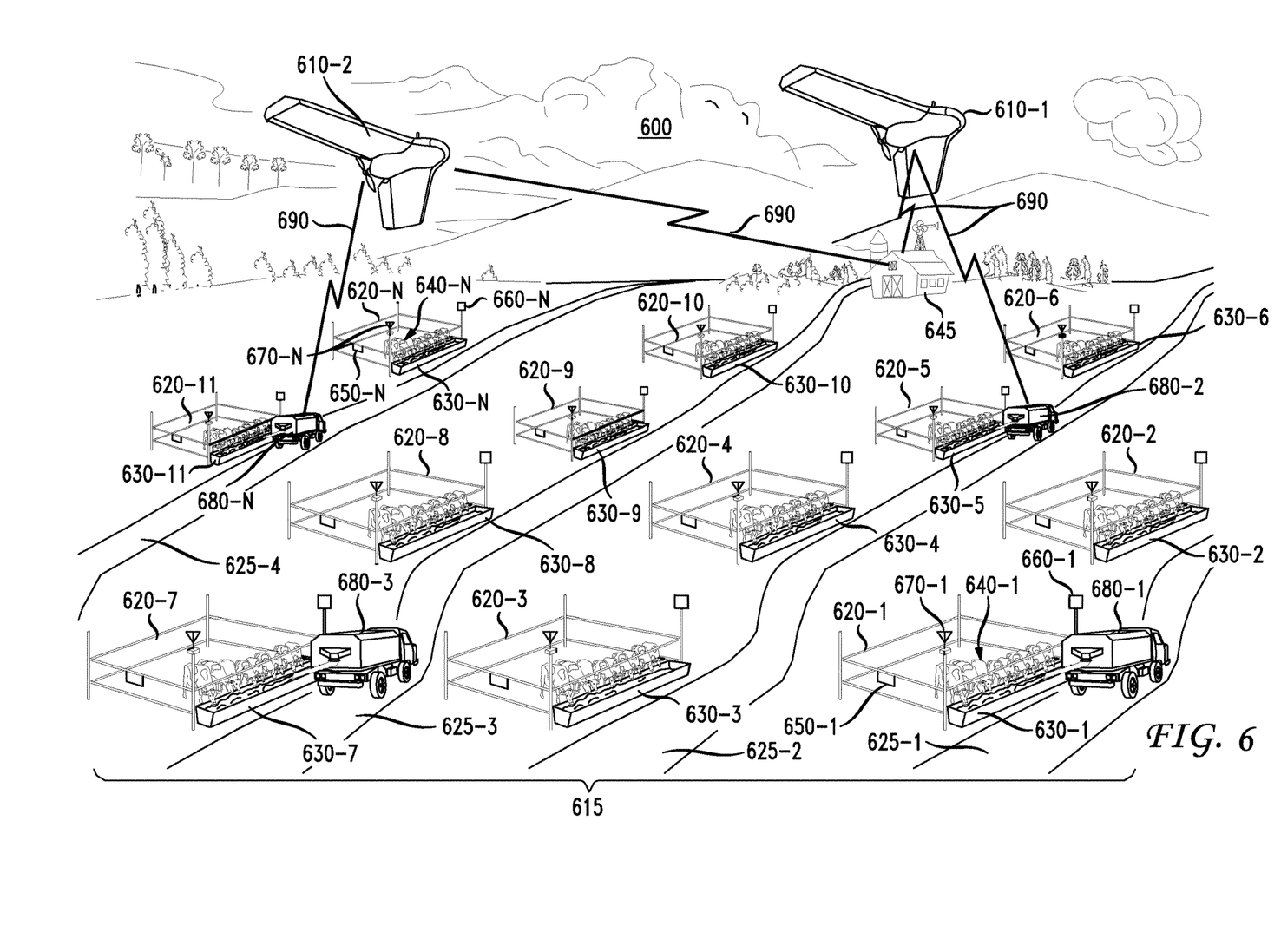
FIG. 6 shows an explanatory diagram of the use of multiple agricultural drones configured in accordance with FIG. 3 and FIG. 4 for monitoring and assisting with the delivery of feed to a feedlot in accordance with an embodiment.

FIG. 6 shows an explanatory diagram 600 of another embodiment utilizing a plurality of feed trucks, i.e., feed truck 680-1 through feed truck 680-N, each configured in accordance with FIG. 1 and FIG. 2 (as shown illustratively in FIG. 4) in combination with multiple agricultural drones configured in accordance with FIG. 3 and FIG. 4. That is, agricultural drone 610-1 and agricultural drone 610-2 are each configured the same as agricultural drone 300 in accordance with FIG. 3 and FIG. 4 and flying over feedlot 615. These flyovers by agricultural drone 610-1 and agricultural drone 610-2 will be in accordance with a defined flight plans in a well-known manner during which agricultural drone 610-1 and agricultural drone 610-2 will each be collecting real-time information with respect to feedlot 615. Of course, while FIG. 6 illustratively shows two drones it will be understood that any number of drones may be utilized in accordance with the principles of the embodiments.

As shown, feed trucks 680-1 through 680-N are travelling along feed alley 625-1, feed alley 625-2, feed alley 625-3, and feed alley 625-4, as the case may be, that are routed through feedlot 615 for the delivery of feed rations to a plurality of feed bunks (i.e., feed bunk 630-1 through 630-N). As shown, agricultural drone 610-1 and agricultural drone 610-2 are flying over feedlot 615 having a plurality of pens (i.e., pen 620-1 through pen 620-N), with each respective pen holding one or more livestock (e.g., cattle 640-1 through 640-N) and configured with a particular one feed bunk of the plurality of feed bunks 630-1 through 630-N, a particular one transmitter (i.e., transmitter 670-1 through 670-N), a particular one bar code (i.e., bar code 660-1 through 660-N) and a particular one identification symbol (i.e., identification symbol 650-1 through 650-N). It will be understand that the plurality of livestock may be any kind (one or many) of livestock or other animals that are typically fed using feedlots.

The flyover by agricultural drone 610-1 and agricultural drone 610-2 will be in accordance with a defined flight plan in a well-known manner during which these agricultural drones will be collecting real-time information with respect to feedlot 615 and/or one or more of the feed bunks associated therewith (i.e., feed bunk 630-1 through feed bunk 630-N). In accordance with this embodiment, the flying of agricultural drone 610-1 and agricultural drone 610-2 and the traversing of feedlot 615 by feed trucks 680-1 through 680-N occur substantially contemporaneously. In accordance with further embodiments, agricultural drone 610-1 and/or agricultural drone 610-2 may fly in advance of the routing (in whole or in part) of feed trucks 680-1 through 680-N where such routing is determined using the information transmitted from agricultural drone 610-1 and/or agricultural drone 610-2.

In accordance with the embodiment, the real-time information collected by agricultural drone 610-1 and/or agricultural drone 610-2 such as feed bunk images, feed bunk temperatures, feed ration data and/or feed bunk analysis will be utilized and communicated, over one or more communications links 690, to field management control center 645 and/or one or more of the feed trucks 680-1 through 680-N to assist with monitoring, analyzing and dispensing feed to one or more feed bunks (e.g., feed bunk 630-1 through 630-N). Further, communications can be exchanged by and between agricultural drone 610-1 and agricultural drone 610-2, in a well-known manner, in order to coordinate their actions and traversing of feedlot 615.

In accordance with the embodiment, the flying of agricultural drone 610-1 and agricultural drone 610-2 and the traversing of feedlot 615 (and associated pens 620-1 through 620-N and feed bunks 630-1 through 630-N) allows the drones, individually and collectively, to monitor and examine individual feed bunks in order to facilitate rapid and real-time estimates of the amount of feed left in a particular feed bunks (e.g., feed bunk 630-1 and feed bunk 630-10) from a prior feeding. Illustratively, such estimate is accomplished on a volume basis whereby a remaining volume of feed in feed bunk 630-1 and in feed bunk 630-10 is determined from the information collected by agricultural drone 610-1 and agricultural drone 610-2, respectively. This data on the amount of feed remaining in a particular feed bunk(s) is then used, in accordance with the embodiment, to determine and adjust the amount feed disbursed in the next feeding and/or to adjust the priority for dispatching feed (e.g., a determination that one feed bunk of the plurality of feed bunks 630-1 through 630-N is particularly low on feed or has been emptied of feed). Illustratively, these feed disbursement adjustments are determined, in well-known fashion, using field management application software that will analyze the real-time information transmitted and received from agricultural drone 610-1 and agricultural drone 610-2. Further, as detailed above, agricultural drone 610-1 and/or agricultural drone 610-2 may also monitor the temperature of the plurality of feed bunks 630-1 through 630-N and/or the temperature of areas immediately surrounding the plurality of feed bunks 630-1 through 630-N to determine whether one or more of the feed bunks are subject to slick or dry feed bunk conditions.

Further, in accordance with an embodiment, agricultural drone 610-1 (and/or agricultural drone 610-2) may be used to assist the feedlot operators tending to feedlot 615 to identify individual feed bunks of the plurality of feed bunks 630-1 through 630-N which may be suffering from chronic low feed level conditions or need additional further attention, for example, suffering from spoilage conditions. As such, agricultural drone 610-1 and/or agricultural drone 610-2 may be programmed (via camera and vision unit 465 as shown in FIG. 4) to capture photographs and/or videos of particular feed bunks and such information can be transmitted (via communications unit 420) to the feedlot operator for analysis. Thereafter, the feedlot operator may communicate further instructions back to either of agricultural drone 610-1 or 610-2 for further information collection and/or making specified adjustments to a particular feed bunk. The analysis may also provide the feedlot operator with advance warning signs directed to weather conditions specific to a particular section of feedlot 615 and/or identify when the next feed bunk re-filling operation should occur and which particular feed bunks are ready for re-fill and/or other ration adjustments.

Figure 7:
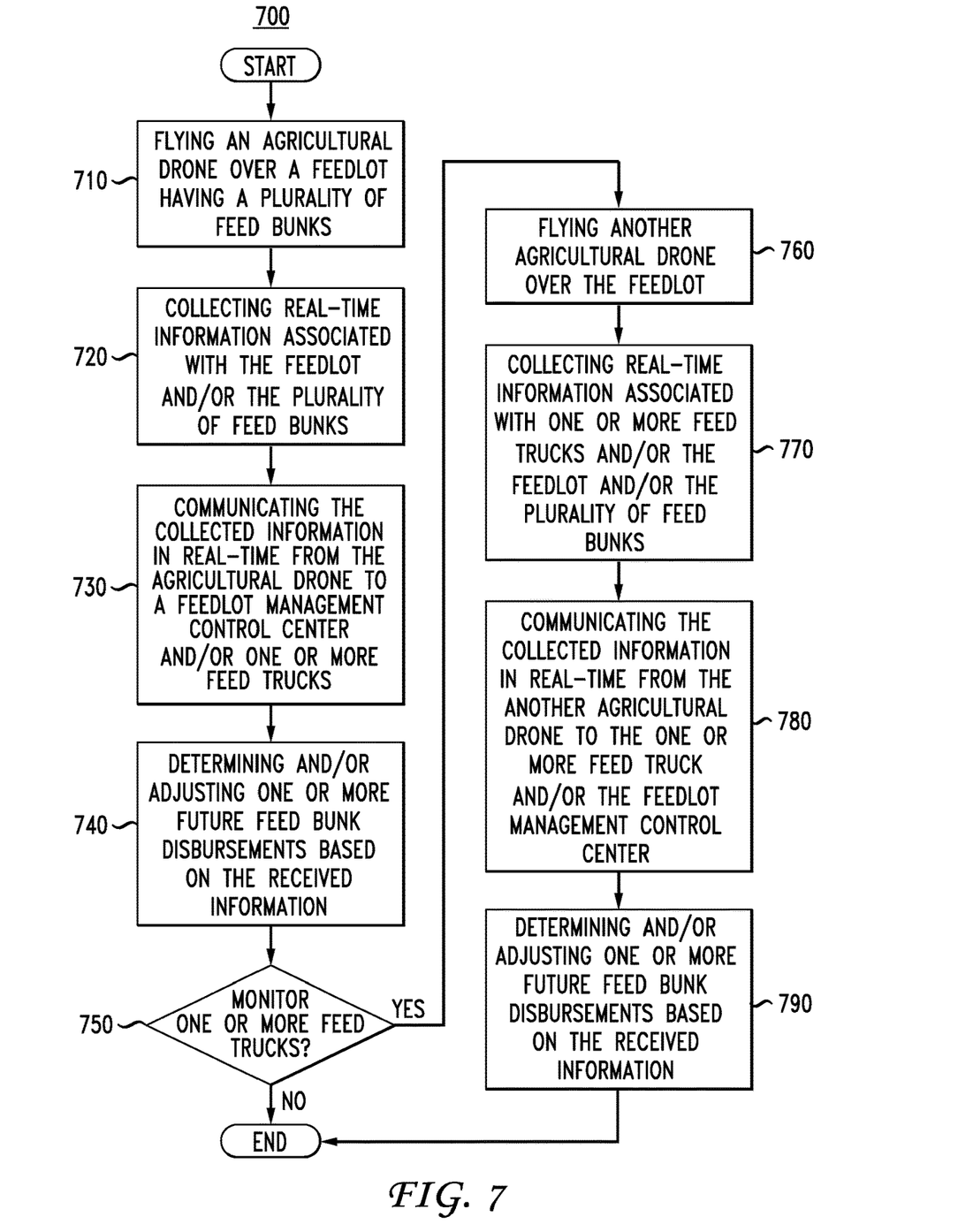
FIG. 7 shows a flowchart of illustrative operations for feed bunk monitoring and analysis utilizing an agricultural drone(s) in accordance with an embodiment.

FIG. 7 shows a flowchart of illustrative operations 700 for feedlots utilizing agricultural drone(s) for feed bunk analysis in accordance with an embodiment. In accordance with the operations of FIG. 7, at step 710, an agricultural drone (i.e., a first agricultural drone) is flown over a feedlot having a plurality of feed bunks and, at step 720, collecting real-time information associated with the feedlot and/or the plurality of feed bunks (e.g., current feed volumes in the individual feed bunks, as detailed herein above) from the first agricultural drone. At step 730, the collected information is transmitted and communicated, in real-time, from the first agricultural drone to a feedlot management control center and/or one or more feed trucks traversing the feedlot substantially contemporaneously with the first agricultural drone, as detailed herein above), and, at step 740, the feedlot management control center and/or one or more of the feed trucks utilize the received information for adjusting one or more future (e.g., the next one) feed disbursements to one or more of the feed bunks.

Advantageously, the real-time collection, communication and utilization of feedlot specific information, in accordance with the embodiment, is realized and exchanged between the agricultural drone and the feedlot management control center and/or one or more feed trucks traversing the feedlot for use in the immediate monitoring, analyzing and adjusting of the distribution of feed to individual feed bunks of the feedlot, as detailed herein above. In addition to the above-described steps, there is also an option of monitoring, at step 750, one or more feed trucks during operation and/or providing additional feedlot analysis capacity. If such monitoring is desired, another agricultural drone (i.e., a second agricultural drone) is flown, at step 760, traversing the feedlot having the plurality of feed bunks and, at step 770, collecting real-time information associated with the feedlot, particular ones of the plurality of feed bunks and/or one or more of the feed trucks from the second agricultural drone. In accordance with an embodiment, the flying of the drones and the traversing of the feedlot by the feed trucks occur substantially contemporaneously. At step 780, the collected information is transmitted and communicated, in real-time, from the second agricultural drone to a feedlot management control center and/or one or more feed trucks traversing the feedlot substantially contemporaneously with the first agricultural drone, as detailed herein above), and, at step 790, the feedlot management control center and/or one or more of the feed trucks utilize the received information for adjusting some future (e.g., the next one) re-filling of one or more of the feed bunks.

Figure 8:
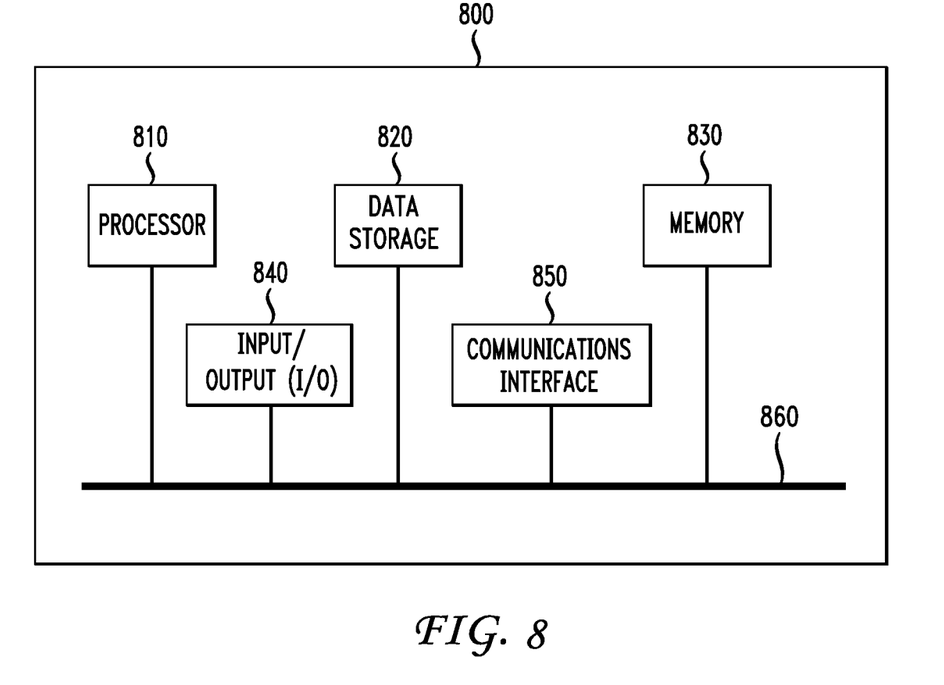
FIG. 8 is a high-level block diagram of a further exemplary feed bunk analysis unit in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "communications device") installed in and/or communicatively connected to a processor or the like. FIG. 8 is a high-level block diagram of feed bunk analysis unit 800 which is an alternative configuration of exemplary feed bunk analysis unit 200 (as shown in FIG. 2) that may be used for enabling agricultural drone(s) and/or feed trucks for feedlot and/or feed bunk analysis in accordance with the various embodiments herein.

Feed bunk analysis unit 800 comprises a processor 810 operatively coupled to a data storage device 820 and a memory 830. Processor 810 controls the overall operation of feed bunk analysis unit 800 by executing computer program instructions that define such operations. Communications bus 860 facilitates the coupling and communication between the various components of feed bunk analysis unit 800. The computer program instructions may be stored in data storage device 820, or a non-transitory computer readable medium, and loaded into memory 830 when execution of the computer program instructions is desired.

Thus, certain of the steps of the disclosed method (see, e.g., FIG. 7) and the associated discussion herein above can be defined by the computer program instructions stored in memory 830 and/or data storage device 820 and controlled by processor 810 executing the computer program instructions. For example, the computer program instructions can be implemented as computer executable code programmed by one skilled in the art to perform the illustrative operations defined by the disclosed method. Accordingly, by executing the computer program instructions, processor 810 executes an algorithm defined by the disclosed method. Feed bunk analysis unit 800 also includes one or more communications interface 850 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Feed bunk analysis unit 800 also includes one or more input/output devices 840 that enable user interaction with feed bunk analysis unit 800 (e.g., camera, display, keyboard, mouse, speakers, microphone, buttons, etc.).

Processor 810 may include both general and special purpose microprocessors, and may be the sole processor or one of multiple processors of feed bunk analysis unit 800. Processor 810 may comprise one or more central processing units (CPUs), for example. Processor 810, data storage device 820, and/or memory 830 may include, be supplemented by, or incorporated in, one or more application-specific integrated circuits (ASICs) and/or one or more field programmable gate arrays (FPGAs).

Data storage device 820 and memory 830 each comprise a tangible non-transitory computer readable storage medium. Data storage device 820, and memory 830, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 840 may include peripherals, such as a camera, printer, scanner, display screen, etc. For example, input/output devices 840 may include a display device such as a cathode ray tube (CRT), plasma or liquid crystal display (LCD) monitor for displaying information to the user, a keyboard, and a pointing device such as a mouse or a trackball by which the user can provide input to feed bunk analysis unit 800.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A system for monitoring and feeding livestock, the system comprising:
    a first agricultural drone configured to fly over a feedlot having a plurality of feed bunks, collect information specific to at least one feed bunk of the plurality of feed bunks, and transmit the collected information specific to the at least one feed bunk in real-time from the first agricultural drone for monitoring the at least one feed bunk.

2. The system of claim 1, wherein a field management control center associated with the feedlot is configured to receive the collected information specific to the at least one feed bunk from the first agricultural drone in real-time.

3. The system of claim 1, wherein the first agricultural drone is further configured to determine a feed level of the at least one feed bunk based on the collected information specific to the at least one feed bunk, and determine a feed ration for the at least one feed bunk using at least the feed level.

4. The system of claim 1, wherein the collected information specific to the at least one feed bunk includes image data of a volume of feed associated with the at least one feed bunk.

5. The system of claim 1, wherein the flying of the first agricultural drone occurs substantially contemporaneously with a traversing of the feedlot by a plurality of feed trucks.

6. The system of claim 1, further comprising:
    a second agricultural drone configured to fly over the feedlot having the plurality of feed bunks, collect information specific to at least one other feed bunk of the plurality of feed bunks, and transmit the collected information specific to the at least one other feed bunk in real-time from the second agricultural drone for monitoring the at least one other feed bunk.

7. The system of claim 6, wherein the first agricultural drone and the second agricultural drone are configured to fly substantially contemporaneously.

8. The system of claim 7, wherein at least one feed truck of a plurality of feed trucks receives the collected information specific to the at least one other feed bunk from the second agricultural drone in real-time and adjusts at least one operation of the at least one feed truck using the collected information specific to the at least one other feed bunk received from the second agricultural drone.

9. The system of claim 8, wherein the adjusting by the at least one feed truck includes an adjustment to a rate of dispensing feed from the at least one feed truck.

10. The system of claim 1, wherein the collected information specific to the at least one feed bunk includes an identification of a particular one pen of a plurality of pens associated with the at least one feed bunk.

11. The system of claim 1, wherein the collected information specific to the at least one feed bunk includes a temperature of the at least one feed bunk.

12. A method for operating an agricultural drone, the method comprising:
   flying the agricultural drone over a plurality of feed bunks;
   collecting information specific to the plurality of feed bunks from the agricultural drone; and
   transmitting the collected information specific to the plurality of feed bunks in real-time from the agricultural drone for monitoring particular ones of the feed bunks of the plurality of feed bunks.

13. The method of claim 12, further comprising:
   adjusting a feed ration for the particular ones of the feed bunks based on the collected information specific to the plurality of feed bunks.

14. The method of claim 12, wherein the flying of the agricultural drone and a traversing of a feedlot associated with the plurality of feed bunks by a plurality of feed trucks occur substantially contemporaneously.

15. The method of claim 14, further comprising:
   collecting and transmitting information specific to at least one feed truck of the plurality of feed trucks from the agricultural drone.

16. The method of claim 13, wherein the collected information specific to the plurality of feed bunks includes a temperature of the particular ones of the feed bunks.

17. The method of claim 12, further comprising:
   determining a feed level of the particular ones of the feed bunks based on the collected information specific to the plurality of feed bunks; and
   determining a feed ration for the particular ones of the feed bunks using at least the feed level determined therefore.

* * * * *